US011516891B2

(12) United States Patent
Rickert

(10) Patent No.: US 11,516,891 B2
(45) Date of Patent: Nov. 29, 2022

(54) HEATING DEVICE AND ELECTRIC COOKER

(71) Applicant: E.G.O. Elektro-Geraetebau GmbH, Oberderdingen (DE)

(72) Inventor: Jochen Rickert, Oberderdingen (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 483 days.

(21) Appl. No.: 16/655,910

(22) Filed: Oct. 17, 2019

(65) Prior Publication Data
US 2020/0137839 A1    Apr. 30, 2020

(30) Foreign Application Priority Data

Oct. 24, 2018   (DE) ...................... 10 2018 218 245.0

(51) Int. Cl.
    *H05B 3/10*     (2006.01)
    *H05B 3/26*     (2006.01)
    *H05B 3/68*     (2006.01)
    *H05B 3/74*     (2006.01)
    *A47J 27/00*    (2006.01)
    *H05B 3/56*     (2006.01)

(52) U.S. Cl.
    CPC ............ *H05B 3/748* (2013.01); *A47J 27/004* (2013.01); *H05B 3/56* (2013.01); *H05B 3/265* (2013.01); *H05B 3/68* (2013.01); *H05B 2203/003* (2013.01); *H05B 2203/014* (2013.01)

(58) Field of Classification Search
    None
    See application file for complete search history.

(56) References Cited

U.S. PATENT DOCUMENTS

| 4,161,648 A | 7/1979 | Göessler |
| 5,498,853 A | 3/1996 | Gross et al. |

(Continued)

FOREIGN PATENT DOCUMENTS

| DE | 2551137 A1 | 5/1977 |
| DE | 4229375 A1 | 3/1994 |

(Continued)

OTHER PUBLICATIONS

The German Patent and Trademark Office, German Search Report for German Patent Application No. 102018218245.0, dated Jul. 15, 2019, (8 pages), Germany.

(Continued)

*Primary Examiner* — Joseph M. Pelham
(74) *Attorney, Agent, or Firm* — Alston & Bird LLP

(57) ABSTRACT

A heating device for an electric cooktop has at least one long heating conductor, one support body on the top side of which the heating conductor is arranged and fitted, and one supporting means for the support body. The heating conductor is designed as a corrugated flat strip which has, on its bottom side, holding elements which are arranged at a distance from one another and integrally project downward and are pushed into the support body. The supporting means supports the support body, at least in its outer region along an outer edge, at the bottom. The support body consists, as a thin plate, of compressed and adhesively bonded mica material, for example micanite, and is therefore electrically insulating and sufficiently stable.

22 Claims, 2 Drawing Sheets

(56) References Cited

U.S. PATENT DOCUMENTS

| | | | | |
|---|---|---|---|---|
| 5,532,458 A | * | 7/1996 | Kratel | C04B 30/00 |
| | | | | 219/460.1 |
| 5,796,075 A | | 8/1998 | Gross et al. | |
| 6,201,220 B1 | | 3/2001 | Leturia Mendieta | |
| 6,207,935 B1 | | 3/2001 | Dittmar et al. | |
| 6,216,334 B1 | | 4/2001 | Hughes | |
| 11,032,877 B2 | * | 6/2021 | Abendschoen | H05B 3/748 |
| 2011/0088138 A1 | * | 4/2011 | Chen | H05B 3/342 |
| | | | | 2/160 |

FOREIGN PATENT DOCUMENTS

| | | | |
|---|---|---|---|
| DE | 19638640 A1 | 4/1998 | |
| EP | 743804 A2 * | 11/1996 | ............ H05B 3/748 |
| EP | 0871346 A2 | 10/1998 | |
| EP | 1011296 A1 | 6/2000 | |
| GB | 2324693 A | 10/1998 | |

OTHER PUBLICATIONS

European Search Report for European Patent Application No. 19201616.0, dated Mar. 13, 2020, (8 pages), European Patent Office, Munich, Germany.

* cited by examiner

HEATING DEVICE AND ELECTRIC COOKER

CROSS-REFERENCE TO RELATED APPLICATIONS

This application claims priority to German Application No. 10 2018 218 245.0, filed Oct. 24, 2018, the contents of which are hereby incorporated herein in its entirety by reference.

BACKGROUND

The invention relates to a heating device as can be used, in particular, for an electric cooker or in an electric cooker, for example as a cooktop, warming plate or as an oven. The invention likewise relates to a corresponding electric cooker comprising at least one heating device of this kind.

U.S. Pat. Nos. 4,161,648 A and 5,498,853 A each disclose a heating device which can be installed in a cooktop beneath a cooktop plate. A plurality of long or elongate heating conductors are fitted on a flat support body composed of electrically and thermally insulating material. Holding elements which are pushed into the support body and thereby hold the heating conductor upright protrude downward from the heating conductors. In this case, the heating conductor can glow in the visible range at temperatures of up to somewhat above 1.000° C. during operation.

BRIEF SUMMARY

The invention is based on the problem of providing a heating device of the kind mentioned at the outset and also a corresponding electric cooker with which problems of the prior art can be solved and it is possible, in particular, to use a stable, expedient and advantageous material for a support body.

This problem is solved by a heating device having the features of claim 1 and also by an electric cooker having the features of claim 25. Advantageous and preferred refinements of the invention are the subject matter of the further claims and will be explained in more detail below. In so doing, some of the features will be described only for the heating device or only for the electric cooker. However, irrespective of this, said features are intended to be able to apply both to the heating device and also to the electric cooker independently and autonomously of one another. The wording of the claims is incorporated in the content of the description by express reference.

The heating device has at least one long heating conductor which, although it can be produced in an elongate manner, is advantageously shortened in the assembled state. To this end, said heating conductor is designed as a corrugated flat strip which has, at least on its bottom side, holding elements which are arranged at a distance from one another. These holding elements project downward or protrude downward. The heating device has an abovementioned support body on the top side of which the heating conductor is arranged and fitted by way of the holding elements being pushed into the support body. In particular, the holding elements are pushed into the support body in this way without recesses, cutouts or the like for the holding elements having been produced or prepared beforehand, or alternatively where such recesses, cutouts or the like can also be produced or prepared beforehand. The heating conductor is easily pushed, by way of the holding elements, into the support body or its top side with appropriate force. In so doing, the heating conductor should be stabilized or held so that it does not tilt, as is known from the abovementioned prior art for so-called radiant heating devices. Said tilting would have a negative effect on the arrangement of the heating conductor on the support body. Furthermore, a supporting means is provided for the support body. Said supporting means supports the support body, at least in its outer region and/or along an outer edge, at the bottom. A relatively thin support body can then be used, which support body is inherently stable but could already be excessively bent due to the load of the heating conductors arranged on it. The supporting means can preferably support the support body at at least one point in the central region or in the center too.

According to the invention, provision is made for the support body to consist of compressed and/or adhesively bonded mica material. Therefore, an insulating material other than that known from the prior art, in particular known and used for radiant heating devices, is used. Mica material of this kind is sufficiently electrically insulating and has sufficiently good thermal insulation properties. Furthermore, it is sufficiently stable to hold the holding elements pushed into it and therefore also the heating conductors.

In an advantageous refinement of the invention, the mica material has, preferably up to approximately 250° C., a coefficient of expansion which is similar to that of the heating conductor. The heating conductor is advantageously an FeCrAl alloy as is known from the prior art for heating conductors of this kind, particularly also when said heating conductors are intended to glow in the visible range during heating operation. The mechanical stability and, respectively, the permanently stable construction of the heating device can be achieved more easily owing to these matched coefficients of expansion. Above the abovementioned temperature of 250° C., the coefficient of expansion of heating conductors of this kind can increase to a certain extent, but this should not present a problem in an advantageous refinement owing to a corrugated shape of the heating conductor. Furthermore, the holding elements can therefore engage more effectively in the support owing to greater expansion at higher temperatures.

The mica material is preferably micanite. Micanite of this kind or mica material in general form is also known, for example, from toasters in which heating coils are wound around a flat plate in order to be mechanically held. However, in this case, the heating conductors are not pushed into the plate itself, but at most pulled into prefabricated cuts. The micanite can comprise muscovite as the main constituent part, or alternatively phlogopite for even higher temperatures.

In one refinement of the invention, provision can be made for the support body to be designed as a plate. It can have, in particular, a planar top side. However, the top side can also be slightly curved, either in a fluted or convex or concave manner. The at least one heating conductor is arranged on the top side and then emits heat upward. The support body is particularly preferably a thin plane-parallel plate. A thickness of between 0.1 mm and 2 mm, in particular 0.2 mm to 0.6 mm, is considered to be advantageous. In the lower thickness range, this can be only just stable, so that the pushed-in holding elements of the heating conductor do not become detached again by themselves. At the same time, not as much mica material is required for a very thin support body.

If the support body is made thicker, it is more inherently stable. Its electrical and thermal insulating properties are then better too. Under certain circumstances, the support body can also be inherently stable in such a way that the supporting means has to be provided only in the outer region or along the outer edge. It can be so thick that the correspondingly short holding elements do not appear again at the bottom side. However, the holding elements preferably emerge from or project beyond the bottom side of the support body again.

In a further refinement of the invention, spacers can be provided in the region of the outer edge of the support body, in particular together with the supporting means. Said spacers can protrude upward beyond the top side of the support body. In this case, the spacers advantageously rest on the top side of the support body. The spacers can particularly advantageously be designed as a substantially continuously encircling ring which allows a distance of the heating device and primarily also the support body with the heating conductors thereon to be maintained from a cooktop plate, which is arranged thereabove, of a cooktop or another cover. If, however, the heating device is used in an oven, in particular as a top heater or bottom heater heating body, and in this case may even be exposed, the spacers on the top side may not be required.

Provision can advantageously be made for the holding elements to be produced separately from the heating conductor as a type of clip and then placed over said heating conductor. These clip-like holding elements are then fitted on the top side of the support body together with the heating conductor, in particular by being pushed into the support body.

However, the holding elements are particularly advantageously integrally formed from the heating conductor or formed on said heating conductor, that is to say the holding elements are connected to the heating conductor in one piece and in one part. Therefore, they consist of the same continuous flat strip material and extend downward from a bottom edge of the heating conductor in one part and in one piece. They are therefore integrally formed from said heating conductor. To this end, the heating conductor can be stamped out of the flat strip material as a strip, where the holding elements are jointly formed on the bottom edge in the process. However, this is also already known in principle from U.S. Pat. No. 5,498,853 A which was mentioned at the outset.

A length of the holding elements can be between 50% and 200% of the height of the heating conductor. In other words, a length of the holding elements can lie between 1 mm and 6 mm, where a height of the heating conductor can generally be a few millimeters, for example 1.4 mm to 7 mm.

According to the invention, the heating conductor is corrugated, preferably uniformly corrugated over its entire length. This corrugation can also comprise the holding elements integrally formed on said heating conductor. A curvature of the holding elements in their longitudinal profile away from the heating conductor, so that they are curved in the manner of a spade or the like, can promote considerably improved strength when inserting or pushing the holding elements into the mica material of the support body. These holding elements which are therefore of more stable design cannot bend so easily when they are pushed into the mica material.

In a further advantageous refinement of the invention, the holding elements can be of tapered design in their longitudinal profile away from the heating conductor or in the direction transverse thereto for the purpose of facilitating piercing of the support body. Said holding elements can therefore have a tapered free tip at the free end. Said tapered free tip can be of directly pointed or somewhat rounded design. Furthermore, a holding element can have a base region which adjoins the bottom edge of the heating conductor. In this region, it is important for the holding element to be well connected to the heating conductor. The holding element has a constant width in the base region, that is to say its side edges are parallel. The tapered free tip then, advantageously directly, adjoins this base region of constant width. A base region of this type can have a length of between 0.1 mm and 2 mm. The base region serves to provide for the holding elements, by way of the base region, to be in the support body when the heating conductor is pushed into the support body by way of the holding elements so that a bottom edge of the heating conductor rests entirely or almost on the top side. The tapered free tip of the holding element, which may possibly have greatly simplified the pushing-in process, then projects beyond the lower side of the support body. When the holding element is inserted into the support body only by way of the base region or is in direct contact with the support body only by way of said base region, and the base region equally has a constant width, the holding element is not pushed out of the relatively stiff mica material so easily. Therefore, the structure is more stable and more durable.

In an advantageous refinement of the invention, an above-described tapered free tip can adjoin said base region. In this case, this tapered free tip can be narrower in its upper region, or where it directly adjoins the base region or extends out of said base region, than the minimum width of the base region. The base region particularly advantageously projects or extends beyond the tapered free tip not only in a direction along the longitudinal profile of the heating conductor but rather on both sides. In particular, the tapered free tip can protrude downward approximately or precisely from the center of the width of the base region. It is considered to be preferred when the base region extends out of the heating conductor in one part and in one piece or is formed with said heating conductor in this way, for example is formed from a flat strip material as part of the holding element in accordance with the abovementioned method. The tapered free tip can likewise advantageously be formed together with the base region as a further part of the holding element.

A base region of this kind can have a width in the direction along the longitudinal direction of the heating conductor or, as it were, have a length which is between 2 mm and 10 mm or between 2 mm and 15 mm. In other words, this width of the base region can be between 100% and 400% of the height of the heating conductor. This is discussed in more detail below.

The base region is advantageously not pushed into the support body or not located in said support body. A support body is preferably produced from reasonably solid material, such as micanite as mentioned at the outset or the like, so that no force has to be applied to push a holding element, even by way of the base region, into the support body. It suffices to push in the holding element. At the same time, said holding element is mechanically weakened to a lesser extent as a result. The base region can be located above the support body or the surface thereof, but as an alternative it can be placed thereon or even be pushed thereagainst on account of the holding element being pushed in by way of the tapered free tip. Therefore, the base region forms, as it were, a support for the heating conductor on the support body and, since the base region has the abovementioned length of approximately 0.1 mm to 2 mm away from the heating conductor, the heating conductor runs, by way of its bottom edge, above the surface of the support body by approximately that amount. This has the advantage that said heating conductor is firstly not cooled on its bottom side by the support body and as a result renders possible improved development of heat, in particular even irradiation of heat upward. Secondly, less heat is input into the support body, which input of heat would otherwise subject said support body to greater thermal and mechanical loading and also would render necessary thermal insulation to a greater extent. Although the development of heat or the heating output is somewhat lower here owing to the widening of the cross section of the heating conductor in the region of the holding element or of the base region, this negative effect is more than compensated for again by the improved irradiation. Furthermore, a defined profile of the heating conductor on the support body or above said support body can also be achieved in this way.

Provision is preferably made for precisely one base region to be provided for each holding element or for all holding elements to each have a single base region. All holding elements are particularly advantageously of identical design, this being able to ensure as uniform a distribution of the heating power over the surface area as possible. In a yet further advantageous refinement of the invention, the heating conductor, by way of its holding elements, in particular the tapered free tips, is pushed into the support body or the surface thereof to an equal extent overall. Uniform production of this kind then also results in heat generation which is as uniform as possible.

It is advantageously possible for the tapered free tip, in the region in which it adjoins the base region, to initially have a constant width to obtain the abovementioned advantage that it is then pushed or embedded into the support body by way of this region of approximately constant width. This region of constant width can form an additional base region, where the additional base region can directly adjoin the base region at the top and merge directly with the tapered free tip at the bottom. The actually tapered region or pointed region then protrudes downward beyond the bottom side of the support body. This can have the effect that this tapered tip cannot be pushed out of the support body so easily on account of its tapering. The additional base region of constant width is specifically located here.

The base region can, at its two ends, run in a straight line in the direction of the heating conductor, that is to say at an angle of 90° to the other bottom edge of the heating conductor, or be beveled or else rounded once or several times. Since it is not intended to be pushed into the support body in the wide configuration in any case, this is not important. Production-related advantages of straight, beveled or rounded shapes can be utilized as desired here.

In one refinement of the invention, a power per unit area of the heating device which lies in the region of the heating conductor or is determined where a heating conductor runs can be at most 4 W/cm$^2$. In particular, a power per unit area can be even lower, for example even lower than 2.5 W/cm$^2$. At such low power densities, it is possible, according to safety regulations, to operate a heating device similarly to an abovementioned radiant heating device beneath a cooktop plate, where it does not require any temperature monitoring in accordance with VDE for this purpose. Therefore, it can be operated in an unsafe manner as it were. Such safety or temperature monitoring would be provided by a so-called safety temperature limiter or rod-type thermostat, as is also shown, for example, in U.S. Pat. No. 5,498,853 A mentioned at the outset.

The at least one heating conductor advantageously covers a large portion of the surface area of the heating device, for which purpose tracks of the heating conductor can run at a distance of between 5 mm and 20 mm from one another on the support body. They can largely run parallel to one another or run parallel to one another by more than 80%, for example in a meandering or spiral manner.

In one refinement, the electric cooker according to the invention can be an electric cooktop with a cooktop plate and a plurality of heating devices, which are designed according to the invention, arranged therebeneath. An operator control apparatus with which operation of the cooktop can be controlled is provided on the cooktop in a manner which is known per se.

In an alternative refinement, the electric cooker according to the invention can be an oven, where it is advantageously conceivable here for the heating device to be installed as a top heater and/or bottom heater in the oven. The invention can specifically provide a relatively expedient heating device for this purpose.

These and further features are apparent from the claims and also from the description and the drawings, where the individual features can in each case be realized on their own or jointly in the form of subcombinations in an embodiment of the invention and in other fields and can constitute advantageous and inherently protectable embodiments for which protection is claimed here. The subdivision of the application into individual sections and sub-headings does not restrict the general validity of the statements made thereunder.

BRIEF DESCRIPTION OF THE DRAWINGS

Exemplary embodiments of the invention are schematically illustrated in the drawings and will be explained in greater detail in the text which follows. In the drawings.

DETAILED DESCRIPTION

Figure 1:
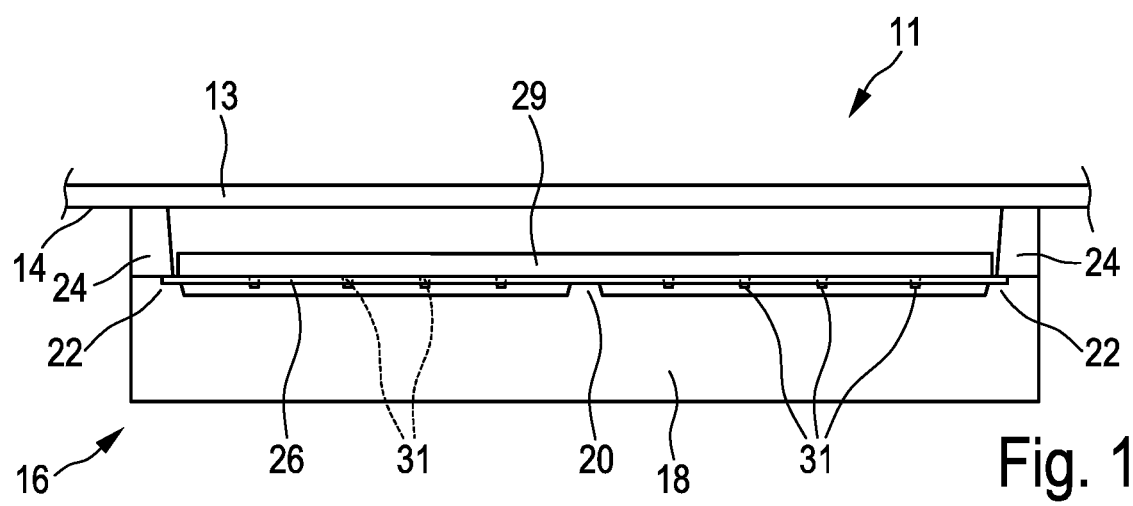
FIG. 1 shows a lateral sectional illustration through an electric cooktop according to the invention with a heating device according to the invention arranged beneath a cooktop plate.

FIG. 1 shows a detail of an electric cooktop 11 according to the invention from the side. The electric cooktop 11 has a cooktop plate 13 against the bottom side 14 of which a heating device 16 according to the invention is pushed in a manner which is not illustrated in any detail. This is advantageously done in a manner which is generally known for electric cooktops of this kind and does not have to be explained in any detail here. The heating device 16 has a flat and thick supporting plate 18 as the abovementioned supporting means. The surface of said supporting plate is substantially planar; a supporting protrusion 20 with a height of a few millimeters is formed only in the center. An encircling supporting edge 22 which is of stepped design is formed on the outside of the supporting plate 18. An annular body 24 which is encircling and which, by way of its top side, is pressed against the bottom side 14 is situated on said supporting edge 22. The annular body 24 may, in certain embodiments, correspond to the spacer or forms the spacers described elsewhere herein, such terminology being used interchangeably. The supporting plate 18 and the annular body 24 are formed from a suitable and known thermally insulating material, possibly different materials. This basic design is known from the prior art, see documents U.S. Pat. Nos. 4,161,648 A and 5,498,853 A which were mentioned at the outset.

A support body 26 according to the invention is placed on the central supporting protrusion 20 and the step of the supporting edge 22. Said support body is advantageously a round disk or plate composed of micanite, as mentioned at the outset, with a thickness of 0.5 mm for example. Owing to being supported in the center by means of the supporting protrusion 20, the inherent stability even of a thin plate of this kind composed of micanite is sufficient in the case of the support body 26 to ensure said support body does not sag downward or does so only to an insignificant extent or such that it does not cause problems. Here, the micanite is ground mica which is adhesively bonded with synthetic resin.

It can be seen that, in the outer edge region, the support body 26 is held between the supporting edge 22 from below and the annular body 24 from above or is clamped between them as it were. Therefore, the arrangement of said support body in the heating device 16 is secure and does not change either during operation or during transportation.

Figure 2:
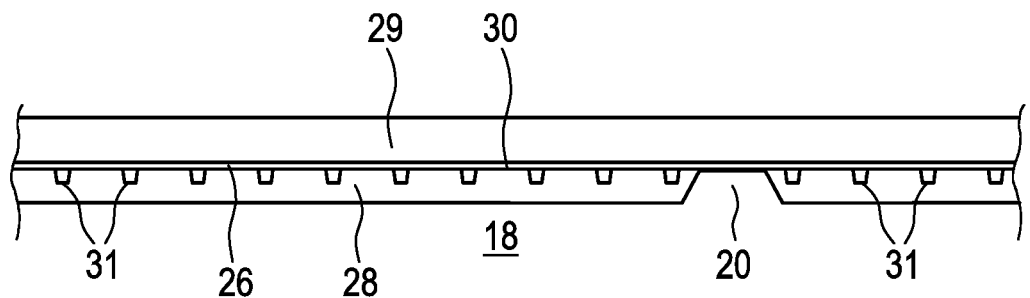
FIG. 2 shows an enlarged illustration of a central region of the heating device from FIG. 1 on its own.

The support body 26 has, on its top side, a heating conductor 29, as was described at the outset. The heating conductor 29 is an upright corrugated flat strip which, by way of a bottom edge, rests on the top side of the support body 26. The heating conductor 29 is fitted to the support body 26 by holding elements 31 which are merely indicated here. To this end, these holding elements, as can be seen more clearly from the enlarged illustration of FIG. 2, are inserted through the support body 26 composed of micanite and extend at the bottom out of the support body 26 by a certain excess length again. It can also be seen in enlarged FIG. 2 that a bottom edge 30 of the heating conductor 29 rests directly on the top side of the support body 26. This is caused by the heating conductor 29 being pushed against the support body 26 with force when the holding elements 31 are pushed in and, as it were, forming a stop by way of the bottom edge 30 stopping or resting against the top side of the support body 26. In the case of other insulating materials, the bottom edge can be pushed into said support body to a certain extent, but not in the case of micanite here.

A pressing-in operation of this kind corresponds substantially to a manufacturing method as is used for known radiant heating bodies according to abovementioned documents U.S. Pat. Nos. 4,161,648 A and 5,498,853 A. In this respect, reference is made to this prior art here.

It can also be seen from the illustration of FIGS. 1 and 2 that the heating conductor 29 is advantageously initially fitted to the support body 26 by the holding elements 31 being pushed into and piercing said support body. The support body 26 with the heating conductor 29 on it is only then installed in the heating device 16. Otherwise, the required stability would not be ensured during the pushing-in operation.

An air gap 28 between the support body 26 or its bottom side and the supporting plate 18 or its top side can be at most a few millimeters high, for example at most 5 mm high. This air gap 28 can function as additional thermal insulation between the heating conductor 29 or the support body 26 which is heated by the heating conductor and the supporting plate 18. Furthermore, the holding elements 31 of the heating conductor 29 which project beyond the bottom side of the support body 26 do not cause problems as a result. However, the air gap 28 could also be entirely dispensed with, see FIG. 6.

As a yet further alternative, the supporting plate 18 composed of thermally insulating material could be entirely dispensed with, so that the support body 26 with the heating conductor 29 on it is now only held in a sheet-metal plate which is customary for radiant heating bodies. A distance, for example of more than 1 mm to 10 mm, which can serve both for electrical insulation and also primarily for thermal insulation can then be provided between the support body 26 and the bottom of a sheet-metal plate of this kind.

Figure 3:
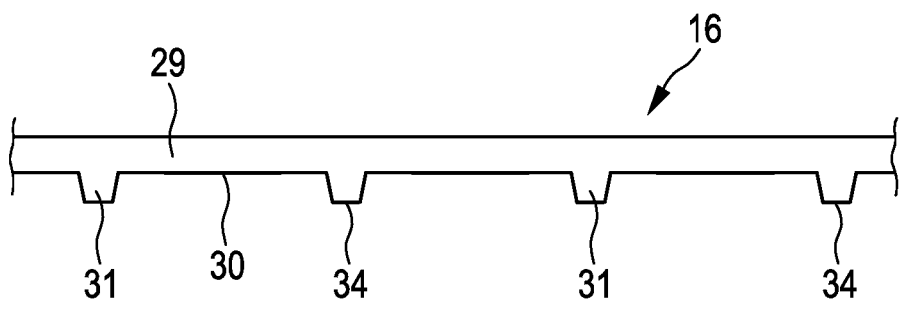
FIG. 3 shows an illustration of a first refinement of a heating conductor similar to FIG. 2.

FIG. 3 shows, for illustration purposes, a heating conductor 29 in the long state in which it is pulled flat. The heating conductor 29 has a substantially straight continuous bottom edge 30 from which the holding elements 31 project integrally downward at regular intervals. As can be seen here, the holding elements 31 are of tapered design over their entire length. At the bottom, they are not tapered to a point or even rounded at a lower end 34, but rather are cut straight. However, the other possibilities can also be implemented. This heating conductor 29 is preferably stamped out of a wide strip or sheet-like flat strip material.

Figure 4:
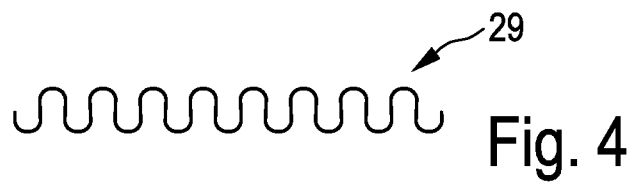
FIG. 4 shows a plan view of a section of a heating conductor similar to the laying pattern of FIG. 1.

FIG. 4 shows a plan view of a heating conductor 29 which is corrugated here. Said plan view is intended to illustrate that the heating conductor 29 is fitted on the support body 26 even when not in the elongated or extended state, but this would also be possible in principle. In the view of FIG. 4 from above, the holding elements 31 according to FIG. 3 cannot be seen. However, it is readily conceivable on the basis of this illustration for at least those holding elements 31 which protrude from a bottom edge of the heating conductor 29 in the region of a pronounced curvature or corrugation according to FIG. 4 to be correspondingly curved. This results in the curvature of the holding elements mentioned at the outset. This occurs firstly almost necessarily owing to the corrugation according to FIG. 4. Secondly, this has the huge advantage that, owing to this corrugation, the holding elements 31 are more stable or more stiff, provided that they are reshaped as a result, and therefore can be pushed into the support body 26 more easily.

Figure 5:
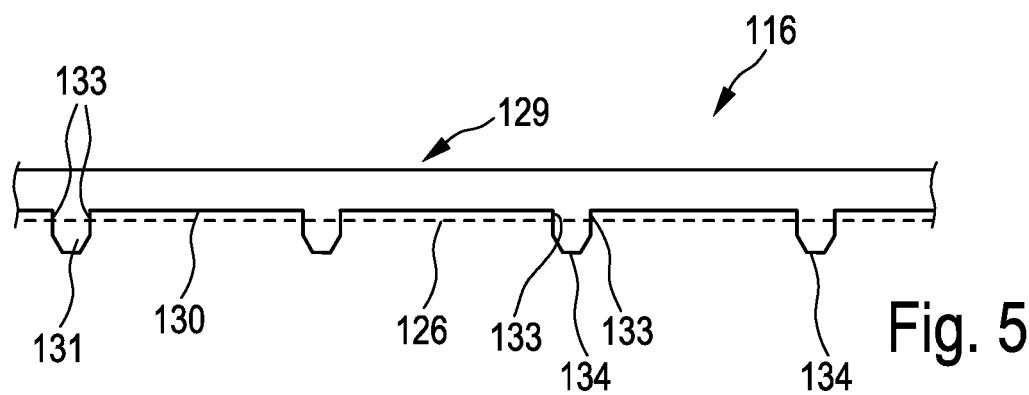
FIG. 5 shows an alternative refinement of a heating conductor according to the invention with holding elements of different design.

FIG. 5 shows an alternative heating conductor 129 of a heating device 116. Holding elements 131 protrude from a bottom edge 130 at regular intervals once again. However, the holding elements 131 are of different design here. They have a base region 133, which has a constant width and which can be 2 mm long for example, directly adjoining the bottom edge 130. A tapered tip 134 adjoins this base region 133. Said tapered tip is designed similarly to FIG. 3 once again.

The advantage of this refinement of the holding elements 131 can be readily seen when looking at the support body 126, illustrated in dashed lines, or the installation state thereon. The holding elements 131 are located, by way of the base region 133, in the support body 126 and, since they are not yet tapered or beveled here, hold better therein and, respectively, cannot be pushed out so easily. The parallel outer edges are neutral in respect of pushing out. This was explained at the outset.

The configuration of the tip 134 can be varied in many ways; it can firstly actually be pointed, but as an alternative it can also be slightly rounded, this likewise facilitating insertion into the support body 126.

In general, recesses or cutouts which are intended to facilitate insertion can already be made or stamped in the support body 126. However, they would then have to be situated in a manner precisely matching the location of the holding element to be inserted.

Figure 6:
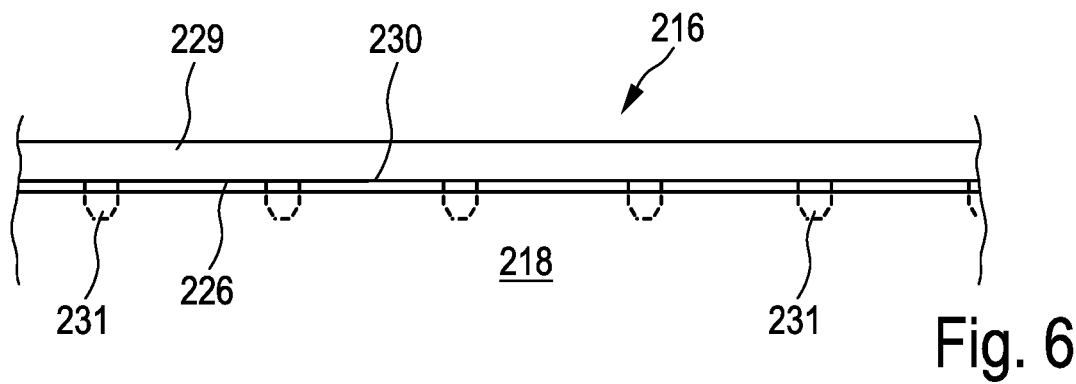
FIG. 6 shows an alternative refinement of a heating device according to the invention similar to FIG. 2 without a distance between the supporting means and the support body.

FIG. 6 shows an alternative heating device 216 in a detail similar to FIG. 2. Here, a heating conductor 229 is inserted, by way of the holding elements 231 illustrated using dotted lines, according to FIG. 3 not only into the support body 226 but also into the planar supporting plate 218 running directly beneath it. The order should also be exactly this. Although it is possible, in principle, to push the heating conductor 229, by way of the holding elements 231, directly onto the layer composite comprising the support body 226 and the supporting plate 218 and to push the holding elements 231 into both said support body and supporting plate in the process, this is expected to be difficult, and therefore a two-stage pushing-in operation is considered to be preferable. The support body 226 with the holding elements 231 in it is then placed and pushed onto the supporting plate 218, and therefore the lower tips of the holding elements 231 are also pushed into said supporting plate.

In the heating device 216 according to FIG. 6, the air gap 28 described in relation to FIG. 2 is admittedly dispensed with, and therefore the thermal insulation is clearly poorer. However, if the heating device is not necessarily intended to operate at very high temperatures of up to 350° C. or briefly up to 700° C., this way of improving the thermal insulation can be dispensed with and a simpler and mechanically more stable design can be preferred for said heating device.

A power per unit area for the heating device 16 according to FIG. 1 advantageously lies at the abovementioned 4 W/cm$^2$ at most. If it particularly advantageously lies below 2.5 W/cm$^2$, the heating device 16 can be used as a warming region or the like in the electric cooktop 11 and does not require any temperature monitoring by a rod-type thermostat mentioned at the outset, as is present in each of the abovementioned prior art documents. An operating temperature of the heating conductor 29 itself can then lie, for example, between 100° C. and 250° C. In the long term, the support body 26 composed of micanite can withstand a temperature of approximately 500° C., or even somewhat more depending on the binder of the support body or of the mica material. In the short term, it can withstand up to 700° C. for less than one minute. However, in principle, a heating device of this kind is not intended to be designed for such high limit temperatures, but just at most 350° C. or only at most 150° C. This is then a so-called warming point in a cooktop as mentioned at the outset.

The support body particularly advantageously consists of a plate composed of micanite containing muscovite, or alternatively containing phlogopite. This is a synthetic mica which is produced from cleaved, broken or ground mica of the corresponding material. To this end, the broken pieces thereof are compressed and baked with synthetic resin as binder, for example as a very thick mica sheet or a mica board or just the mica plate as described above. However, production thereof is known to a person skilled in the art.

Figure 7:
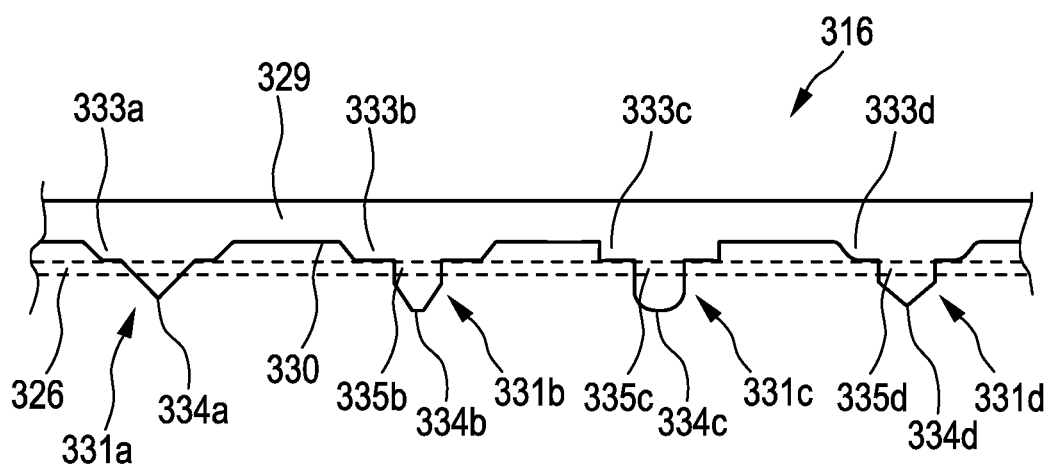
FIG. 7 shows a further alternative refinement of a heating conductor according to the invention with holding elements of yet different design.

FIG. 7 shows another alternative heating conductor 329 of a heating device 316. Holding elements 331a to 331d protrude downward from a bottom edge 330 of the heating conductor 329 at regular intervals. However, the holding elements 331 are each of different design here, this being illustrated in this way only for reasons of clarity. In practice, advantageously all of the holding elements 331 are of identical design. However, they all have a base region 333a to d, which can have different widths, advantageously between 5 mm and 15 mm, directly adjoining the bottom edge 330. A tapered tip 334 adjoins the respective base region 333 in each case. The tapered tip 334 can be of similar design to the preceding figures.

In the case of the holding element 331a on the far left, the base region 333a extends with a bevel from the bottom edge 330. The base region 333a rests on the top side of the support body 326. A tapered tip 334a which is designed to taper to a point extends from the center of the base region 333a. This tapered tip 334a is inserted or penetrates through the support body 326 and thereby constitutes the fitting of the heating conductor 329 to the support body 326, where the tapered tip 334a itself is held in the support body 326. Stable holding is possible owing to the identifiable wide support region of the bottom edge of the base region 333a to the left and to the right of the tapered tip 334a on the support body 326. It is virtually impossible to push further into the support body 326 and this is also not intended either. It can also be seen here how the bottom edge 330 of the heating conductor 329 runs clearly over the top side of the support body 326 to the left and to the right of the holding element 331a.

A base region 333b of similar design is provided in the case of the second holding element 331b. A tapered tip 334b which protrudes from the center of said base region has an additional base region 335b directly adjoining the base region 333b. This additional base region 335b has a constant width. It is located in the support body 326, the bottom edge of the base region 333b resting on the top side of said support body. The additional base region 335b projects slightly downward beyond the support body 326, with the tapered tip 334b then adjoining said additional base region. Said tapered tip serves primarily for pushing the entire holding element 331b into the support body 326 more easily.

A base region 333c, which protrudes from the bottom edge 330 of the heating conductor 329, is likewise provided in the case of the third holding element 331c. However, said base region does not protrude in an inclined manner, but rather largely at a right angle. An additional base region 335c of constant width, which additional base region ends in a rounded tapered tip 334c, protrudes downward from the center of the bottom edge of said base region 333c. The region of the bottom edge of the base region 333c to the left and to the right of the additional base region 335c is once again relatively wide and can also be readily supported on the top side of the support body 326 under the action of force, without being pressed in. In this case too, the additional base region 335c runs completely through the support body 326. The rounded tip 334c can, as explained at the outset, have advantages over a beveled tip during pushing in and/or production.

In the case of the fourth holding element 331d, a base region 333d with a rounded shape runs downward from the bottom edge 330 of the heating conductor 329. In this case too, a transition into an additional base region 335d of the holding element 331d, specifically into an additional base region 335d which has a constant width, is once again provided in the center. A tip 334d which is tapered to a point and serves for insertion into or through the support body 326 adjoins said additional base region. The rounded shape of the base region 333d may possibly facilitate production of the heating conductor 329 and also prevent micro-damage phenomena at the bottom edge 330 at the transition to the base region 333d.

Even though the distance of the tapered tips 334a to d in FIG. 7 is similar to those in the case of FIGS. 3 to 6, the distance should be greater than there in practice. In particular, a length of the free bottom edge 330 of the heating conductor 329 should be similar to that in FIGS. 3 to 6. FIG. 7 specifically reveals that, given a dimensioning selected here, the distance between the holding elements 331a to d is relatively small, and therefore the resulting increases in size or widening of the heating conductor cross section could have excessively negative effects on a uniform glowing pattern or a uniform heating effect of the heating device 316.

The invention claimed is:

1. A heating device for an electric cooker, said heating device comprising:
    at least one heating conductor,
    a support body with a top side, wherein said heating conductor is arranged and fitted on said top side of said support body, and
    a supporting means for said support body,
    wherein:
        said heating conductor is designed as a corrugated flat strip,
        said strip has, at least on a bottom side of said strip, holding elements,
        said holding elements are arranged at a distance from one another and project or protrude downward,
        said holding elements are pushed into said support body,
        said supporting means support said support body, at least in an outer region or along an outer edge of said support body, in downward direction,
        said support body consists of compressed or adhesively bonded mica material,
        a holding element has a base region, said base region adjoining a bottom edge of said heating conductor and having a length of between 0.1 mm and 2 mm in a direction transversely away from said heating conductor, and
        said base region is not arranged in said support body but, respectively, runs above support body or is placed onto said support body.

2. The heating device as claimed in claim 1, wherein a coefficient of thermal expansion of said support body or of said material of said support body differs by at most 10% from that of said heating conductor.

3. The heating device as claimed in claim 2, wherein said coefficient of thermal expansion of said support body or of said material of said support body differs by at most 10% from that of said heating conductor up to a temperature of 250° C.

4. The heating device as claimed in claim 1, wherein said mica material is micanite.

5. The heating device as claimed in claim 1, wherein said support body is designed as a plate on which said at least one heating conductor is arranged.

6. The heating device as claimed in claim 5, wherein said support body is a thin plane-parallel plate with a thickness of between 0.1 mm and 2 mm.

7. The heating device as claimed in claim 1, wherein spacers are provided above said top side of said support body in a region of said outer edge of said support body, in order to maintain a distance from a cooktop plate of a cooktop, wherein said cooktop plate is to be arranged above said support body.

8. The heating device as claimed in claim 7, wherein said spacers are provided as a substantially continuously encircling ring.

9. The heating device as claimed in claim 1, wherein said holding elements are integrally formed from said heating conductor or are integrally formed on said heating conductor.

10. The heating device as claimed in claim 9, wherein said holding elements consist of said flat strip of said heating conductor and extend downward from a bottom edge of said heating conductor.

11. The heating device as claimed in claim 1, wherein a length of said holding elements is 50% to 200% of a height of said heating conductor.

12. The heating device as claimed in claim 1, wherein a length of said holding elements lies between 1 mm and 6 mm.

13. The heating device as claimed in claim 1, wherein said holding elements are of tapered design in a longitudinal profile in a direction away from said heating conductor.

14. The heating device as claimed in claim 1, wherein said holding elements are of tapered design in a longitudinal profile in a direction away from said heating conductor and have a tapered tip.

15. The heating device as claimed in claim 1, wherein said base region has a constant width.

16. The heating device as claimed in claim 1, wherein each said holding element is formed on precisely one said single base region.

17. The heating device as claimed in claim 1, wherein said holding elements have a tapered tip adjoining said base region.

18. The heating device as claimed in claim 17, wherein said tapered tip has an upper region having a width less than a minimum width of said base region.

19. The heating device as claimed in claim 1, wherein said base region has a width of between 2 mm and 10 mm.

20. The heating device as claimed in claim 1, wherein said base region has a width of between 100% and 400% of a height of said heating conductor in a direction along a longitudinal direction of said heating conductor.

21. The heating device as claimed in claim 1, wherein a power per unit area in a region of said heating conductor is at most 4 W/cm$^2$.

22. An electric cooker comprising at least one heating device as claimed in claim 1, wherein said electric cooker is designed as an electric cooktop or as an electric oven.

* * * * *